(12) United States Patent
Ko et al.

(10) Patent No.: US 7,065,502 B2
(45) Date of Patent: Jun. 20, 2006

(54) MEDIA AND METHOD OF UPDATING COMMODITY CATALOG INFORMATION

(75) Inventors: Jung-wan Ko, Yongin (KR); Byung-jun Kim, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 364 days.

(21) Appl. No.: 09/809,631

(22) Filed: Mar. 16, 2001

(65) Prior Publication Data

US 2001/0054016 A1 Dec. 20, 2001

(30) Foreign Application Priority Data

May 22, 2000 (KR) ................ 2000-27500

(51) Int. Cl.
- *G06F 17/60* (2006.01)
- *G06F 17/30* (2006.01)
- *G09B 7/00* (2006.01)

(52) U.S. Cl. .............. 705/51; 705/27; 705/26; 707/3; 434/362; 706/927

(58) Field of Classification Search ............ 705/1, 705/51, 26, 27; 434/362; 706/929
See application file for complete search history.

(56) References Cited

U.S. PATENT DOCUMENTS

| | | |
|---|---|---|
| 5,090,007 A | 2/1992 | Bulthuis |
| 5,241,531 A | 8/1993 | Ohno et al. |
| 5,644,782 A | 7/1997 | Yeates et al. |
| 5,694,546 A | 12/1997 | Reisman |
| 5,812,519 A | 9/1998 | Kawamura et al. |
| 5,924,096 A | 7/1999 | Draper et al. |
| 5,937,158 A * | 8/1999 | Uranaka .................... 713/200 |
| 5,953,309 A * | 9/1999 | Yoshimoto et al. ....... 369/275.3 |
| 6,032,130 A | 2/2000 | Alloul et al. |
| 6,076,103 A * | 6/2000 | Sakai ........................ 709/217 |
| 6,091,930 A * | 7/2000 | Mortimer et al. ........... 434/362 |
| 6,266,650 B1 * | 7/2001 | Sugaya et al. ............... 705/27 |
| 6,424,968 B1 * | 7/2002 | Broster et al. ................ 707/3 |

(Continued)

FOREIGN PATENT DOCUMENTS

EP 0 802 527 10/1997

(Continued)

OTHER PUBLICATIONS

Japanese Office Action for Japanese Application No. 2001-063644 dated Jan. 27, 2004.

(Continued)

*Primary Examiner*—Firmin Backer
*Assistant Examiner*—Daniel L. Greene
(74) *Attorney, Agent, or Firm*—Stein, McEwen & Bui, LLP

(57) ABSTRACT

A medium, which is accessed by a reproducing/recording apparatus, having a read-only area in which commodity catalog information provided by a vendor is written and where only a read operation is allowed, and a writeable area in which predetermined commodity catalog information provided by a server is updated and where a write operation of user information for later retrieval is allowed. Using the medium, consumers can easily access the latest commodity catalog information at any time, and make secure purchases using identity verification methods using the latest commodity catalog information. The use of the medium and system accelerates the purchasing system so as to increase sales, files a purchase record on the consumer side, which provides a guarantee mechanism for refund or exchange in the future. Further, since the commodity catalog information is distributed online, labor and financial waste can be reduced.

20 Claims, 2 Drawing Sheets

U.S. PATENT DOCUMENTS 6,538,761 B1    3/2003    Yokono et al.

FOREIGN PATENT DOCUMENTS

| | | | |
|---|---|---|---|
| EP | 0 817 181 | | 1/1998 |
| JP | 05-298337 | | 11/1993 |
| JP | 07295998 A | * | 11/1995 |
| JP | 9-505923 | | 6/1997 |
| JP | 10-162079 | | 6/1998 |
| JP | 11-007436 | | 1/1999 |
| JP | 11-39718 | | 2/1999 |
| JP | 11-126186 | | 5/1999 |
| JP | 11-176020 | | 7/1999 |
| JP | 2000-40253 | | 2/2000 |
| WO | 97/36233 | | 10/1997 |
| WO | WO 99/33241 | | 7/1999 |

OTHER PUBLICATIONS

English translation of Japanese Patent Publication No. 07-295998 provided by Japanese Patent Office.

* cited by examiner

MEDIA AND METHOD OF UPDATING COMMODITY CATALOG INFORMATION

CROSS-REFERENCE TO RELATED APPLICATIONS

This application claims the benefit of Korean Application No. 00-27500, filed May 22, 2000, in the Korean Industrial Property Office, the disclosure of which is incorporated herein by reference.

BACKGROUND OF THE INVENTION

1. Field of the Invention

The present invention relates to a readable and/or writeable media and a method of using the same, and more particularly, to a media for editing/updating the latest commodity information online, and a method of so doing.

2. Description of the Related Art

When commodities are sold in catalogs, the catalogs need to be continuously updated to introduce new commodities. However, consumers purchase commodities by referring to the catalogs, regardless of whether they have been updated.

There are basically two systems used conventionally to allow consumers to purchase products; one is an offline purchasing system, and the other is an online purchasing system. According to the offline purchasing system, a supplier provides a commodity catalog, usually in the form of a book-like paper catalog, to consumers, and the consumers select items to be purchased by referring to the catalog. Then, the consumers visit an actual store where commodities are sold to purchase their desired commodity items, pay for the purchased items, and then carry the purchased items home.

Several problems with this method are that necessary commodities may not be available from the consumers' visited store, and the commodity catalog information may not be offered opportunely. Also, pricing updates may not be done properly. Further, the consumer must be involved in almost all of the purchase processes in person.

It is also similarly known to order the commodities using a telephone, or using the mail, where the ordered commodities are delivered using the mail. These mail order methods present similar problems with regard to availability and lack of timely updated commodity catalog information, except that the consumer need not actually visit the store.

According to the online purchasing system, the consumers access the Internet, browse virtual shopping malls to retrieve their desired commodities, and then order their desired commodities. The consumers then make a payment associated with the ordered commodities using wire transfers or credit cards, the identities of the consumers are authenticated, and the merchant checks the credit cards for approval. Then, the consumers' ordered items are then transported to the consumers.

When using the online purchasing system, the consumers must access the network to sort through virtual shopping malls or a large number of products to order the products they want to purchase, which is a very cumbersome process. Other problems with this method include the fact that it is not easy to authenticate the consumer's identity, and further that consumer information may be divulged in an unsecured status. Also, consumer information may be intentionally distributed or sold by unreliable shopping malls.

SUMMARY OF THE INVENTION

To solve the above and other problems, it is an object of the present invention to provide a medium for supplying consumers with updated commodity information at any time.

It is another object of the present invention to provide a commodity information updating method of supplying consumers with updated commodity information at any time.

Additional objects and advantages of the invention will be set forth in part in the description which follows and, in part, will be obvious from the description, or may be learned by practice of the invention.

Accordingly, to achieve these and other objects according to an embodiment of the present invention, an optical recording/reproducing medium has a read-only area in which commodity information is written, and a writeable area in which predetermined commodity information provided by a server are allowed to be updated and written.

According to another aspect of the present invention, the read-only area is divided into a first area in which predetermined commodity information of a manufacture time when the data is written to the medium, and a second area in which a vendor's encrypted key is written.

According to yet another aspect of the present invention, the writeable area is divided into a first area in which a commodity information update date is written, a second area in which updated commodity information is written, a third area in which commodity purchase information is written, and a fourth area for a user's private information.

According to still another aspect of the present invention, the writeable area is an area in which predetermined information is repeatedly written by the server and the user.

According to a further embodiment of the present invention, a method of updating commodity information recorded on a medium in a writeable or readable apparatus comprising, if the medium is mounted on the apparatus, accessing a commodity information server corresponding to the commodity information written on the medium through a computer network, if a link is set up with the corresponding commodity information server, checking whether there is a commodity item to be updated/edited in the commodity information written on a first predetermined area of the medium, if there is a commodity item to be updated/edited, transmitting the corresponding commodity information from the commodity information server to the apparatus, and writing the transmitted commodity information on a rewriteable area of the medium.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE PREFERRED EMBODIMENTS

Figure 1:
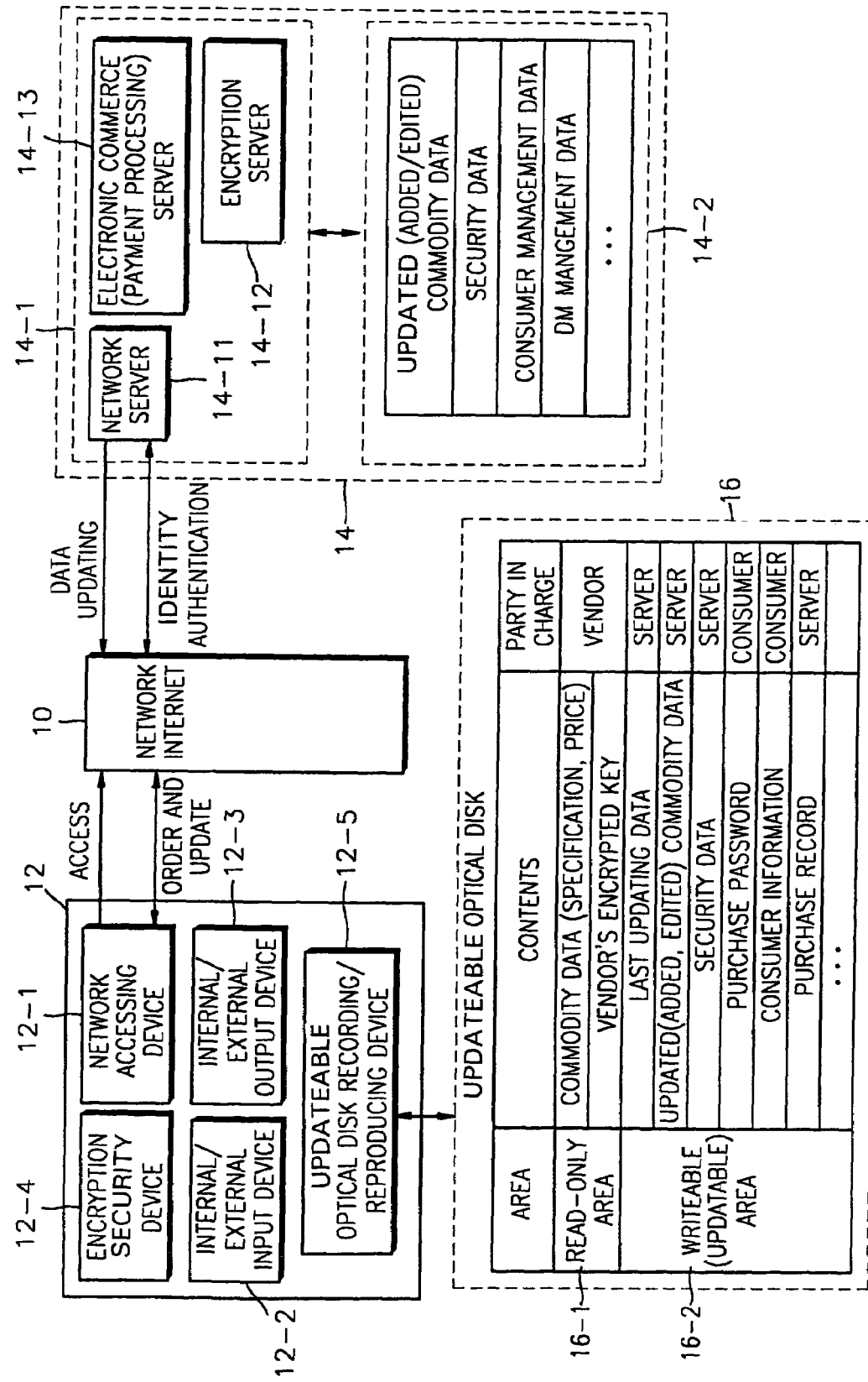
FIG. 1 is a block diagram of a system for implementing a commodity information updating method according to an embodiment of the present invention.

Reference will now be made in detail to the present preferred embodiments of the present invention, examples of which are illustrated in the accompanying drawings, wherein like reference numerals refer to the like elements throughout. The embodiments are described below in order to explain the present invention by referring to the figures.

FIG. 1 is a block diagram of a system for implementing a commodity catalog information updating method according to an embodiment of the present invention. The system includes a computer network 10, a user terminal 12 that is linked to the computer network 10 and receives updated/edited data, a commodity information server 14 to transmit the updated/edited data to the user terminal 12, and an updateable optical disk 16.

According to the shown embodiment, the user terminal 12 includes a network interfacing device 12-1 which allows access the computer network 10, an internal/external input device 12-2 to receive input from a user, an internal/external output device 12-3 to output necessary information to an internal/external display device such as a CRT display device, printer, etc. (not shown), an encryption (security) device 12-4 to perform identity authentication and cryptographic communication, and an updateable optical disk recording/reproduction device 12-5 for reading/writing from/to the optical disk 16.

The commodity information server 14 includes a server 14-1 and a server database 14-2. The server 14-1 includes a network server 14-11 to access the computer network 10, an electronic commerce (payment processing) server 14-13, and an encryption server 14-12. The server database 14-2 includes data and various kinds of information by which the optical disk 16 can be updated/edited.

The optical disk 16 includes a non-writeable, read-only area 16-1 and a writeable (updateable or rewriteable) area 16-2 where a write operation can be performed.

The operation of the system shown in FIG. 1 will now be described in detail.

The computer network 10 transmits/receives data to/from computers. The computer network can be an Ethernet, a Local Area Network (LAN), a Metropolitan Area Network (MAN), a WAN (Wide Area Network), a wireless computer network, and/or preferably the Internet.

The user terminal 12 is a desktop computer or a personal computer (PC), and is either a general-purpose computer or a special-purpose computer. The user terminal 12 allows access to the computer network 10, and the network interfacing device 12-1 transmits and/or receives data through the computer network 10. The internal/external input device 12-2 (which can be a keyboard, a remote controller, a mouse or any other device allowing input into the user terminal 12) inputs an instruction or data supplied by the user to the user terminal 12. The internal/external output device 12-3 (which includes an internal or external LCD or TV, a printer or any other device by which data can be output from the user terminal) provides data requested by the user in the form of a hard copy, a file or graphics. The encryption device 12-4 authenticates the user's identity and executes cryptographic communication, together with the encryption server 14-12 of the commodity information server 14.

The updateable optical disk recording/reproducing device 12-5 records or reproduces data on or from the editable/editable optical disk 16. It is understood that other forms of media might be used, such as magnetic media, magneto-optical media, a combination of RAM and ROM, or any other media allowing storage and retrieval of information.

The updateable optical disk recording/reproducing device 12-5 reproduces data from the read-only area 16-1 or the writeable (updateable) area 16-2 of the optical disk 16, or records the updated/edited data received through the network interfacing device 12-1 on the writeable area 16-2 of the optical disk 16. In the read-only area 16-1 of the optical disk 16, non-erasable, read-only data is written as found in a compact disk read-only memory (CD-ROM) or a digital versatile disk read-only memory (such as DVD-ROM). In the writeable area 16-2, data is erasable or writeable as found in rewriteable compact disks (such as CD-RW) or rewriteable digital versatile disks (such as DVD-RW).

Further, while not shown, it is understood that the writeable area 16-2 could be or have a writeable area that is not rewriteable is found in optical disks (such as CD-R) or writeable digital versatile disks (such as DVD-R). Such a writeable area might be used to permanently a user's personal information, purchase records, or other information that is written once to the optical disk 16 and needs to be permanently stored.

A contents vendor provides the optical disk 16 to the user. The optical disk 16 can include contents other than commodity information, such as Karaoke, an encyclopedia, navigation information, music, software, where an update would be in the form of commodities related to these contents such as new movies scenes, new paraphernalia, updated music remixes, or software module add-ons.

The commodity catalog data of the time of manufacture of the optical disk 16 and a commodity vendor encrypted key are written in the read-only area 16-1. The last update date data of the optical disk 16, updated commodity catalog data, purchase file data, security data, and/or the consumer's private data are written in the writeable area 16-2. The writeable area 16-2 is an area that can be written on either by the commodity information server 14 and/or the user.

While not shown, it is understood that the contents provider could provide the optical disk 16 together with the user terminal 12 such that the optical disk 16 is not-separately distributed from the user terminal 12 such as in personal digital assistants (PDAs), firmware in computers, cell-phones, or other items in which the user terminal 12 is itself distributed.

The commodity information server 14 is a server known in the computer-related field and basically functions as a web server to transmit and/or receive data over the Internet. The server commodity information 14 includes known hardware and software for communication with the user terminal 12. The commodity information server 14 allows the user terminal 12 to be accessed through the computer network 10. The network server 14-11 transmits the updated/edited data, the electronic commerce server 14-13 supports electronic commerce, and the encryption server 14-12 processes user authentication together with the encryption device 12-4 of the user terminal 12. The server database 14-2 contains the latest updateable/editable data, security data, consumer information or purchase information, and provides the same to the user terminal 12 through the computer network 10.

The updateable optical disk 16, which has an initial database and an encrypted key (encrypted key for server) to be used by the commodity information server 14, is first distributed to the user. The user mounts the optical disk 16 on the user terminal 12 for use, as shown in FIG. 1. The user terminal 12 can be accessed through the computer network 10, which allows access to the server 14 to receive the updated/edited data to be written on the optical disk 16.

The database (i.e., the commodity data in the read only area 16-1) is distributed on the optical disk 16 after user registration that allows use by the user. Prior to use, the last update date of the commodity catalog information is received from the commodity information server 14 and compared with the last update date written on the writeable area 16-2 of the optical disk 16. If the dates are different (i.e., if updated/edited data exists), the necessary commodity catalog data to be updated/edited is transmitted from the commodity information server 14 and automatically written on the writeable area 16-2 of the optical disk 16. By doing so, newly added commodities, changed prices, changed commodity inventory, changed commodity functions and/or status can be updated.

Therefore, the user can retrieve the latest commodity catalog information at any time through the optical disk 16 when accessing the computer network 10, and can purchase the desired commodity according to the commodity catalog information. During the user's retrieval of commodity catalog information, the user is offered the updated commodity catalog information and the non-updated commodity catalog information, which are distinctively marked with different colors or blocks so that the user can conveniently retrieve the commodity catalog information.

Figure 2:
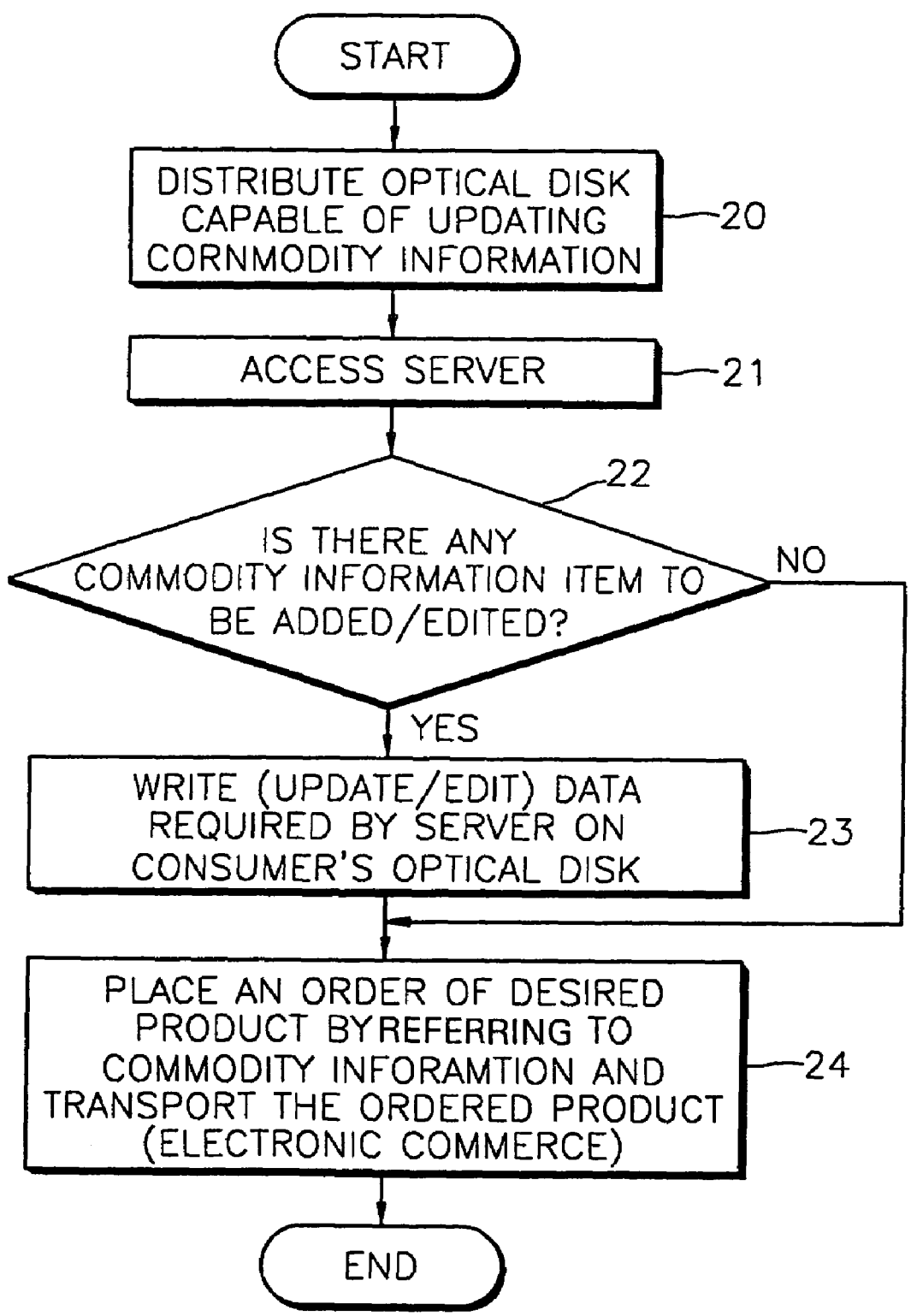
FIG. 2 is a flow chart illustrating a method of updating commodity information according to an embodiment of the present invention.

FIG. 2 is a flow diagram showing the operation of a method of updating an optical disk for electronic commerce according to the present invention. The method includes distributing an updateable optical disk 16 to consumers (operation 20), accessing a commodity information server 14 (operation 21), determining whether there is commodity catalog information item to be updated/edited (operation 22), recording data required by the commodity information server 14 on the optical disk 16 (operation 23), and ordering a desired commodity by referring to the commodity catalog information and transporting the ordered commodity to a user (operation 24).

Specifically, in operation 20, a commodity vendor distributes a catalog having information of commodities sold by the vendor written on the read-only area 16-1 of the optical disk 16 to a user. Here, no separate registration nor administration are necessary. A vendor encrypted key may be additionally used, but is not required in all circumstances. The encrypted key is used to strengthen security during electronic commerce.

While not shown, it is understood that the commodity catalog information may also be uploaded from the optical disk 16 onto a hard drive or other drive within the user terminal 12 such that the optical disk 16 is not again mounted within the user terminal 12.

In operation 21, the user (consumer) accesses the vendor's commodity information server 14 through the computer network 10. If the user accesses the vendor's electronic commerce server 14-13 to make a vendee registration, the electronic commerce server 14-13 adds user information to the server database 14-2 to make the user enter an individual password to be used in the purchase, and then records the input password on the server database 14-2. Then, an encrypted key for authorization of the individual password is written on the optical disk 16. By doing so, the password is not divulged, and either an offline purchase and/or an online purchase can be made that includes password verification. Further, the encrypted password can be used for the vendee's identity authentication.

Also, the consumer's personal data is received and can be utilized for marketing analysis, such as the user's purchase preferences or direct-mail (DM).

In operation 22, after accessing the commodity information server 14, it is determined whether there is a commodity catalog information item to be updated/edited. If there is a commodity catalog information item to be updated/edited, the commodity catalog information required by the server database 14-2 is written (updated/edited) on the user's optical disk 16 in operation 23.

Specifically, after accessing the commodity information server 14, the last update date of the optical disk 16 is read. Then, if there is a commodity catalog information item to be updated/edited, the commodity catalog information required by the server database 14-2 is transmitted to be written on the writeable area 16-2 of the user's optical disk 16, to then be displayed in combination with existing catalog information. The commodity catalog information contains not only three-dimensional information, rather than two-dimensional information, but also function or service information. Thus, new commodities, changed price, commodity inventory, commodity function or status can be updated by comparing the ages of the commodity catalog information on the optical disk 16 and the server 14.

In operation 24, the commodity catalog information written on the optical disk 16 is retrieved, and a desired product is ordered. During a user's retrieval of the commodity catalog information, the user is offered both the updated and non-updated commodity catalog information. The two types of information (i.e., the updated and non-updated commodity catalog information) are distinctively marked with different colors or blocks, which allows the user to conveniently retrieve the commodity catalog information.

If the user places an order after retrieval of the commodity catalog information, the basic information, such as a payment instrument or a delivery place, is input to the commodity information server 14, and then the commodity information server 14 requests entry of a credit card number or a number of any other indicated payment instrument that allows electronic payment (e.g., direct access to an account, deductions from credits on user's account with vendee, etc.). Then, a secured transmission route is acquired through the encryption server 14-12 to be transmitted. In this stage, the user's identity is verified. If the identity verification and payment confirmation are done, the vendor proceeds to the next operation of transporting the ordered product and transmitting the related purchase information to the user. The transmitted information is written on the optical disk 16 as the evidence of the sale, which will be necessary for refund or exchange in the event of delivery failure or damage to the commodity.

As described above, according to the present invention, consumers can easily access the latest commodity catalog information at any time, and purchase products using the latest commodity catalog information securely. Also, the purchasing process is made faster and the purchase record is automatically filed with the consumer such as on the optical disk, guaranteeing a refund or exchange in the future.

Also, an increase in sales can be expected for suppliers owing to an easy-to-use, secure purchasing system, which has the purchase record is filed both on the server and with the consumer, and an identity verification can be done easily and accurately so as to reduce commodity loss. Further, labor waste can be reduced in the course of marketing using the user data generated. Since commodity catalog information is distributed online, labor and financial waste can be further reduced.

Although a few preferred embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method of updating commodity catalog information recorded on a medium using a recording/reproducing apparatus, the method comprising:

after the medium is mounted in the apparatus, accessing a server corresponding to the commodity catalog information written on the medium through a computer network, after user registration;

after the link is set up with the corresponding server, checking whether there is a commodity item to be updated/edited in the commodity catalog information written on a predetermined read-only area of the medium', after there is a commodity item to be updated/edited, transmitting the corresponding commodity catalog information from the server to the apparatus', writing the transmitted commodity catalog information on a rewriteable area of the medium', displaying the commodity catalog information recorded on the rewriteable area of the medium for retrieval after said writing the transmitted commodity catalog information, wherein, during said displaying of the commodity catalog information, the commodity catalog information is marked so that an updated portion and a non-updated portion are distinguished from each other.

2. The method according claim 1, wherein the updated portion and the non-updated portion are marked with different colors.

3. The method according claim 1, further comprising recording a purchase order based on the retrieval of the commodity catalog information from the medium.

4. The method according claim 1, wherein said checking whether there is a commodity item to be updated/edited is performed through communication with the commodity information server.

5. A method of purchasing from and updating commodity catalog information recorded on a medium, comprising:

accessing a server corresponding to existing commodity catalog information read from the medium, after user registration;

receiving updated commodity catalog information from the server; and writing the received updated commodity catalog information on a writeable area of the medium, wherein:
the existing commodity catalog information is written in a read-only area of the medium, and
the updated commodity catalog information is written in a write once area of the medium.

6. The method according to claim 5, wherein:
the existing commodity catalog information has a corresponding age that is read from the medium,
the updated commodity catalog information has a corresponding age that is read from the server, and
said receiving the updated commodity catalog information comprises
comparing the ages of the existing and updated commodity catalog information, and
receiving the updated commodity catalog information where the ages are different.

7. The method according to claim 6, wherein the existing commodity catalog information comprises original commodity catalog information written in the read-only area of the medium, and previously updated commodity catalog information written in the writeable area of the medium.

8. A method of purchasing from and updating commodity catalog information recorded on a medium, comprising:

accessing a server corresponding to existing commodity catalog information read from the medium, after user registration;

receiving updated commodity catalog information from the server;

writing the received updated commodity catalog information on a writeable area of the medium; and displaying both the existing and updated commodity catalog information such that the updated commodity catalog information is marked to be distinguishable from the existing commodity catalog information, wherein:
the existing commodity catalog information is written in a read-only area of the medium,
the existing commodity catalog information has a corresponding age that is read from the medium,
the updated commodity catalog information has a corresponding age that is read from the server, and
said receiving the updated commodity catalog information comprises
comparing the ages of the existing and updated commodity catalog information, and
receiving the updated commodity catalog information where the ages are different.

9. The method according to claim 5, further comprising making a purchase of a commodity using the existing and/or updated commodity catalog information.

10. The method according to claim 9, further comprising
receiving a purchase record from the server after said making the purchase, and
writing the purchase record to the writeable area of the medium.

11. The method according to claim 8, further comprising making a purchase of a commodity using the existing and/or updated commodity catalog information.

12. The method according to claim 11, further comprising
receiving a purchase record from the server after said making the purchase, and
writing the purchase record to the writeable area of the medium.

13. A recording/reproducing medium, comprising:
a read-only area in which original commodity catalog information is written; and
a writeabte area in which updated commodity catalog information is written when provided by a server, after user registration,
wherein said writeable area comprises:
a write once area to which data can be written once; and
a rewriteable area to which data can be repeatedly written and/or from which data can be erased.

14. The recording/reproducing medium according to claim 13, wherein said read-only area comprises
a first area in which the original commodity catalog information as of a manufacture time of the medium is written, and
a second area in which an encrypted key of a vendor is written.

15. The recording/reproducing medium according to claim 13, wherein said writeable area comprises
a first area in which a commodity catalog information update date is written,
a second area in which updated commodity catalog information is written,
a third area in which commodity purchase information is written, and
a fourth area for a user's private information.

16. The recording/reproducing medium according to claim 13, wherein said writeable area is an area in which predetermined information is repeatedly written by the server and a user.

17. The recording/reproducing medium according to claim 14, wherein said writeable area comprises a first area in which a commodity catalog information update date is written, a second area in which updated commodity catalog information is written, a third area in which commodity purchase information is written, and a fourth area for a user's private information.

18. The recording/reproducing medium according to claim 17, wherein said writeable area is an area in which predetermined information is repeatedly written by the server and the user.

19. The recording/reproducing medium according to claim 13, wherein said writeable area comprises an area to which information is optically written.

20. The recording/reproducing medium according to claim 13, wherein said writeable area comprises an area to which information is magnetically written.

* * * * *

UNITED STATES PATENT AND TRADEMARK OFFICE
CERTIFICATE OF CORRECTION

PATENT NO. : 7,065,502 B2  Page 1 of 1
APPLICATION NO. : 09/809631
DATED : June 20, 2006
INVENTOR(S) : Jung-wan Ko et al.

It is certified that error appears in the above-identified patent and that said Letters Patent is hereby corrected as shown below:

Column 7, line 9, change " ',"  to -- ; --

Column 7, line 12, change " ',"  to -- ; --

Cloumn 7, line 14, change " ',"  to -- ; --

Column 8, line 41, change "writeabte" to -- writeable --

Signed and Sealed this

Fifth Day of December, 2006

JON W. DUDAS
*Director of the United States Patent and Trademark Office*